J. A. KUYSER.
VENTILATING APPARATUS.
APPLICATION FILED MAR. 3, 1914.

1,268,020.

Patented May 28, 1918.

WITNESSES:
F. A. Lind.
R. D. Brown.

INVENTOR
Jan Arthur Kuyser
BY
Wiley E. Carr
ATTORNEY

UNITED STATES PATENT OFFICE.

JAN ARTHUR KUYSER, OF EDGEWOOD, PENNSYLVANIA, ASSIGNOR TO WESTINGHOUSE ELECTRIC AND MANUFACTURING COMPANY, A CORPORATION OF PENNSYLVANIA.

VENTILATING APPARATUS.

1,268,020.

Specification of Letters Patent.

Patented May 28, 1918.

Application filed March 3, 1914. Serial No. 822,207.

*To all whom it may concern:*

Be it known that I, JAN ARTHUR KUYSER, a subject of the Queen of Holland and a resident of Edgewood, in the county of Allegheny and State of Pennsylvania, have invented a new and useful Improvement in Ventilating Apparatus, of which the following is a specification.

My invention relates to ventilating apparatus, and it has special reference to ventilating means for dynamo-electric machines provided with two-layer armature windings.

The object of my invention is to provide a simple, effective and inexpensive means for cooling certain parts of alternators and other dynamo-electric machines during the operation thereof.

In the design and construction of dynamo-electric machines of high capacity, it is exceedingly important that adequate ventilation be provided in order to dissipate the heat developed in the operation of such apparatus. Machines provided with two-layer armature windings develop particularly high local temperatures between the coils of the winding.

According to my invention, I provide a ventilating space between the two superposed coils in each of the armature slots by introducing wedges of insulating material therein, in such relation to the armature coils and to each other that the coils are kept separate from each other and are held firmly in place, while, at the same time, they are subjected, throughout their length and on a large part of their surface areas, to circulating currents of air.

Figure 1:
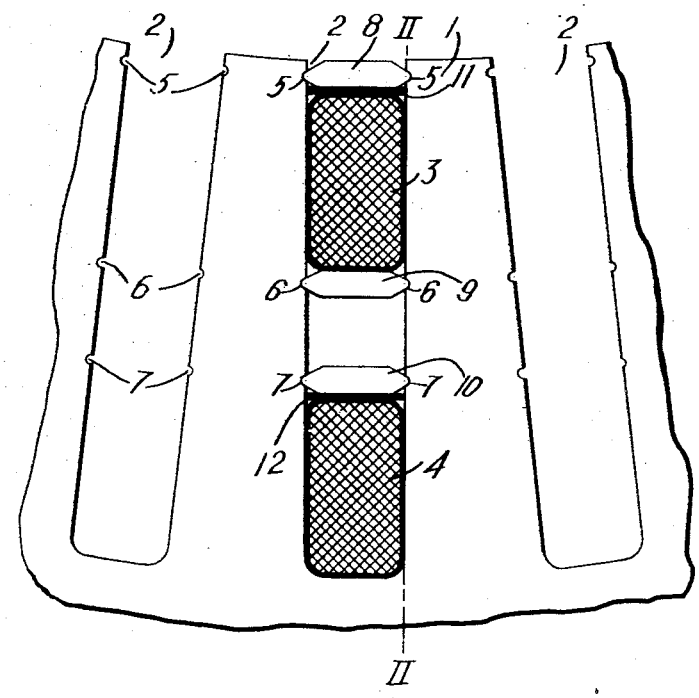
Figure 2:
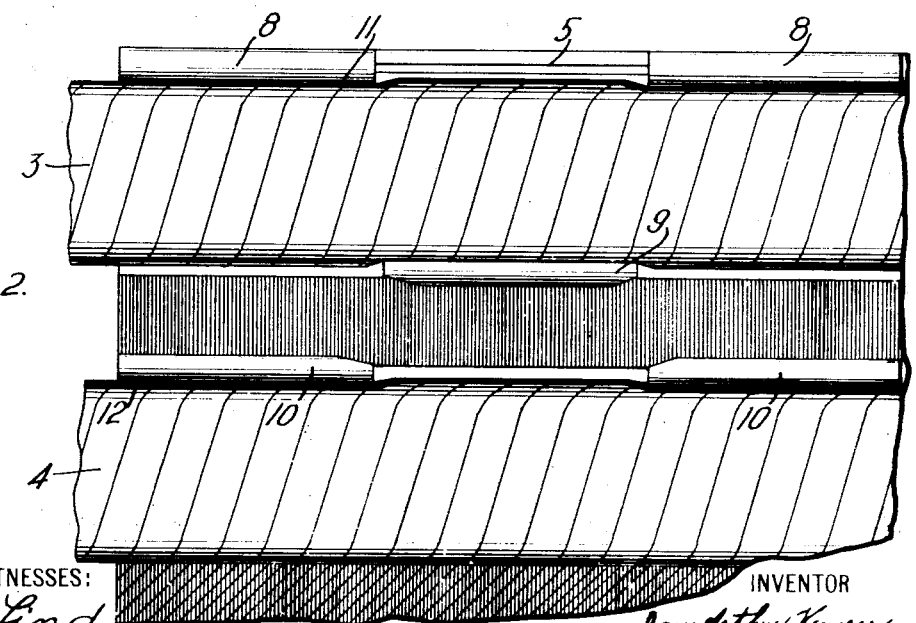

In the accompanying drawing, Figure 1 is a transverse sectional view through a portion of the stator of an alternator provided with a two-layer stationary armature winding, and Fig. 2 is a longitudinal sectional view of the parts shown in Fig. 1, the section being taken substantially along the line 2—2 of Fig. 1.

Referring to the drawing, the stator 1 is composed of laminated sheet metal in the ordinary manner, and is provided with slots 2, which are of sufficient depth to contain two layers of armature coils 3 and 4 in spaced relation to each other. The sides of each slot are provided with oppositely disposed pairs of shallow grooves, one pair of grooves 5—5 being located near the outer end of the slot and two other pairs 6—6 and 7—7 being disposed approximately midway down the sides of the slots.

Short wedges 8, having beveled edges, are driven into the grooves 5—5, and serve to prevent the coils from escaping from the slots. The outer layer of coils 3 is maintained in a position raised above the inner layer 4 by means of other short wedges 9, similar to the wedges 8, driven into the pairs of grooves 6—6. The inner layer of coils 4 is held in its position at the bottom of the slot by other similar short wedges 10 driven into the grooves 7—7.

The wedges may be made of hard fiber or any other suitable strong insulating material, and may be formed of any convenient short length. For example, in the parts shown in the drawing, the slots are about three-fourths of an inch wide, and the wedges may be about two inches long and about three-sixteenths of an inch in thickness. The wedges in the same set of grooves are spaced apart by a distance somewhat more than the length of one wedge, and the wedges in the several pairs of grooves are in staggered relation to one another, as is shown in Fig. 2, the wedges 8 being directly above the spaces between the wedges 9, and the wedges 9 being directly above the spaces between the wedges 10.

The wedges 8 and 10, when driven into their slots, effect a slight compression of the coils 3 and 4, respectively, leaving slight bulges between the wedges. In order to facilitate the driving of the wedges, strips 11, of insulating material, may be laid upon the coils 3 before the wedges 8 are driven, and similar strips 12 may be laid upon the coils 4.

It will be readily understood from the foregoing description, and from the drawing, that both of the coils are effectually ventilated, since the air space between the superposed layers of coils is of relatively large extent in proportion to the size of the coils, and since the wedges which support and confine the coils are in contact with the coils only at intervals.

A further advantage of the structure which I have shown and described is that the air encounters no obstacles to its free circulation between the coils, as is the case in the devices for separating layers of coils that have heretofore been employed. My ventilating device is of very inexpensive construction, and it has the further advantage that no metal supporting parts are used. Its use is therefore not attended by static discharges or by any extra losses due to eddy currents.

Since many modifications may be made in the structure which I have shown and described without departing from the spirit and intent of my invention, I desire that only such limitations shall be imposed as are indicated in the appended claims.

I claim as my invention:

1. Ventilating means for armature slots carrying conductors arranged in a plurality of superposed layers comprising means for maintaining the said layers a sufficient distance apart to secure an appreciable air space between them, the said means comprising a series of discontinuous members for supporting certain of the said conductors above the remaining conductors and other separate and independent discontinuous members for confining the remaining conductors to the bottom of the slot whereby ventilating currents traversing said air space may impinge at intervals upon the exposed surfaces of said layers.

2. Ventilating means for armature slots carrying conductors arranged in a plurality of superposed layers, comprising means for maintaining the said layers a sufficient distance apart to secure an appreciable air space between them, the said means comprising spaced wedges for supporting certain of the said conductors above the remaining conductors and other spaced wedges for confining the remaining conductors to the bottom of the slot whereby ventilating currents traversing said air space may impinge at intervals upon the exposed surfaces of said layers.

3. Ventilating means for armature slots carrying conductors arranged in a plurality of superposed layers comprising means for maintaining the said layers a sufficient distance apart to secure an appreciable air space between them, the said means comprising a plurality of short coil-supporting wedges disposed in longitudinal grooves in the sides of the slot, and other similarly disposed wedges for confining part of the conductors to the bottom of the slot, the wedges in the several slots being in staggered relation to one another, and the wedges in the same slots being separated by a distance at least as great as the length of a single wedge.

4. Ventilating means for armature slots carrying conductors arranged in a plurality of superposed layers comprising means for maintaining the said layers a sufficient distance apart to secure an appreciable air space between them, the said means comprising a series of wedges spaced apart and disposed in longitudinal grooves in the walls of the slots for supporting certain of the said conductors above the remaining conductors and another series of similarly disposed wedges for confining the remaining conductors to the bottoms of the slots the wedges of one series being arranged in staggered relation to the wedges of the other series, whereby ventilating currents traversing said air space may alternately impinge upon the exposed surfaces of said layers.

5. Ventilating means for armature slots carrying conductors arranged in a plurality of superposed layers comprising means for maintaining the said layers a sufficient distance apart to secure an appreciable air space between them, the said means comprising a plurality of spaced wedges disposed in a pair of longitudinal grooves in the sides of the slot for supporting certain of the said conductors above the remaining conductors, and other similarly spaced wedges disposed in a second pair of longitudinal grooves for confining the remaining conductors to the bottom of the slot, the wedges in one pair of grooves being arranged in staggered relation to the wedges in the other pair whereby ventilating currents traversing said air space may alternately impinge upon the exposed surfaces of said layers.

In testimony whereof, I have hereunto subscribed my name this 20th day of Feb., 1914.

JAN ARTHUR KUYSER.

Witnesses:
R. D. BROWN,
B. B. HINES.